H. BETZ.
NUT LOCK.
APPLICATION FILED SEPT. 15, 1909.

949,412.

Patented Feb. 15, 1910.

Witnesses
James F. Crown
H. F. McInay

Inventor
Henry Betz
By Watson E. Coleman
Attorney

UNITED STATES PATENT OFFICE.

HENRY BETZ, OF LA FONTAINE, INDIANA.

NUT-LOCK.

949,412.

Specification of Letters Patent.

Patented Feb. 15, 1910.

Application filed September 15, 1909. Serial No. 517,884.

*To all whom it may concern:*

Be it known that I, HENRY BETZ, a citizen of the United States, residing at La Fontaine, in the county of Wabash and State of Indiana, have invented certain new and useful Improvements in Nut-Locks, of which the following is a specification, reference being had to the accompanying drawings.

This invention relates to improvements in nut-locks of that class in which the nut is locked to the bolt; and it consists in the details of construction hereinafter fully described and claimed.

The object of the invention is to improve and simplify the construction and operation of devices of this character and thereby render them more effective and less expensive.

Figure 1:
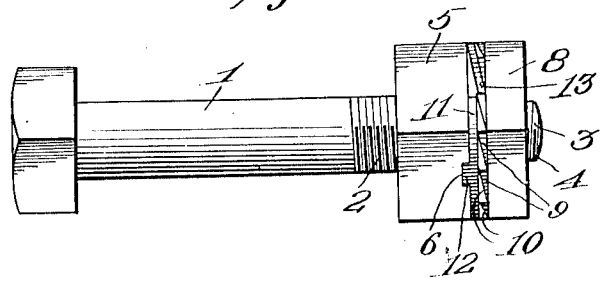
Figure 2:
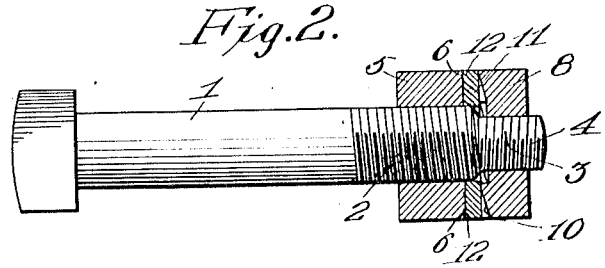
Figure 3:
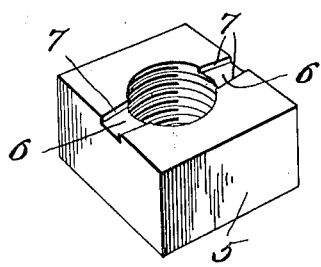
Figure 4:
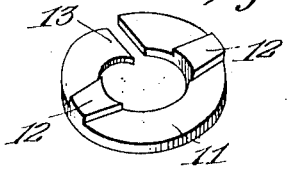
Figure 5:
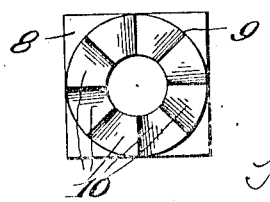

In the accompanying drawings Figure 1 is a side elevation of my improved nut-lock; Fig. 2 is a longitudinal section; Fig. 3 is a perspective view of the inner or lower nut; Fig. 4 is a similar view of the locking washer; and Fig. 5 is a view of the ratchet surface on the inner or under face of the outer nut.

In the drawings 1 denotes a bolt or the like having adjacent to one of its ends screw threads 2 and beyond said threads a reduced portion 3 with screw threads 4. The threads 2, 4 are oppositely inclined, the inner threads 2 being preferably right hand threads while the outer ones 4 are left hand.

5 denotes a nut of any suitable shape formed with a threaded bore to engage the right hand screw threads 2 on the bolt and having a flat outer face in which are formed at diametrically opposite points radial grooves or recesses 6. The side walls 7 of said recesses converge outwardly toward each other.

8 denotes an outer nut of any suitable shape formed with a threaded bore to engage the screw threads 4 of the bolt and formed upon its inner or under face with a circular boss 9 disposed concentric with the opening or bore of the nut and having its face formed with an annular series of ratchet teeth 10. Each of said teeth has one abrupt face forming a shoulder and an inclined face extending from the latter, the inclined faces of all the teeth extending in the same direction.

11 denotes a locking washer interposed between the two nuts and constructed from an annular plate of spring steel or other resilient metal. Formed on one of the side faces of the washer plate 11 at diametrically opposite points are two lugs 12, the latter are formed integral with the washer plate and project laterally from its side face, such lugs being flat and of uniform thickness and extending radially from the edge of the opening or bore of the washer plate to the outer edge of the latter. The side edges of the lugs 12 converge outwardly so that they will fit in the openings 6 of the nut 5 and effectively lock the washer to said nut, and also allow said washer plate to lie flat against the adjacent end of the nut. At a point midway between the lugs 12 the washer is split radially and one of its ends 13 is beveled and sprung outwardly to form a resilient pawl which engages the ratchet teeth 10 of the nut 8. By constructing the washer in this manner it will be seen that the washer nut 8 may be screwed inwardly on the bolt toward the nut 5, but it will be prevented from being screwed outwardly or off of the bolt by reason of the engagement of the pawl 13 with the ratchet teeth 10.

In using the invention the bolt 1 after being passed through the object or objects which it engages, has the nut 5 screwed home upon it just the same as when an ordinary bolt or nut is used. The locking washer is then applied to the bolt and its lugs 12 forced into the recesses 6, thereby locking the washer to the nut 5. The outer nut 8 is then applied and screwed inwardly on the reduced threaded extremity 3 of the bolt, and it will be retained in such position by the engagement of the pawl 13 with the ratchet teeth 10. Owing to the right and left threads on the bolt and the interposition of the locking washer between the nuts, the latter will be effectively locked on the bolt and can not possibly work loose.

Having thus described the invention what is claimed is:

In a nut lock, the combination of a bolt having at one of its ends right and left screw threads, one set of threads being formed on a reduced extremity of the bolt, an inner nut engaged with the inner screw threads and formed in its outer face at diametrically opposite points with radially extending recesses, the side walls of said recesses being arranged in outwardly converging relation, an outer nut screwed on the reduced threaded extremity of the bolt and formed upon its inner face with a circular boss provided with an annular series of radial ratchet teeth, and a split annular locking washer having a flat body interposed between the nuts, one extremity of said washer being bent outwardly and engaged with the ratchet teeth on the outer nut, the inner face of said washer being formed at diametrically opposite points, and at points equally distant from its spaced ends with flat radially extending lugs, the latter being of uniform thickness from the opening in the washer to its outer edge, and having their side walls disposed in outwardly converging relation to fit the opposing recesses in the inner nut.

In testimony whereof I hereunto affix my signature in the presence of two witnesses.

HENRY BETZ.

Witnesses:
 FRANK MARSH,
 CHAS. MOST.